(12) United States Patent
Ho

(10) Patent No.: US 8,277,932 B2
(45) Date of Patent: Oct. 2, 2012

(54) MEMBRANES, METHODS OF MAKING MEMBRANES, AND METHODS OF SEPARATING GASES USING MEMBRANES

(75) Inventor: W. S. Winston Ho, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 13/164,022

(22) Filed: Jun. 20, 2011

(65) Prior Publication Data

US 2011/0269906 A1 Nov. 3, 2011

Related U.S. Application Data

(63) Continuation of application No. 11/666,700, filed as application No. PCT/US2005/040420 on Nov. 4, 2005, now abandoned.

(60) Provisional application No. 60/625,517, filed on Nov. 5, 2004.

(51) Int. Cl.
| | |
|---|---|
| *B01D 53/00* | (2006.01) |
| *B01D 67/00* | (2006.01) |
| *C08K 3/20* | (2006.01) |
| *C08K 3/26* | (2006.01) |
| *C08L 29/04* | (2006.01) |
| *C08L 71/02* | (2006.01) |

(52) U.S. Cl. ............. 428/221; 95/45; 95/58; 95/59; 95/51; 96/4; 427/245; 427/335; 427/385.5; 428/500; 525/56; 525/58; 525/59; 525/60; 525/185; 525/190; 525/326.9

(58) Field of Classification Search ........... 428/221, 428/500; 95/45, 48, 49, 51; 96/4; 427/245, 427/335, 385.5; 525/56, 58, 59, 60, 185, 525/190, 326.9

See application file for complete search history.

(56) References Cited

U.S. PATENT DOCUMENTS

| | | | |
|---|---|---|---|
| 4,762,535 | A | 8/1988 | Pez et al. |
| 4,911,844 | A | 3/1990 | Linder et al. |
| 5,259,950 | A | 11/1993 | Shiro et al. |
| 5,269,931 | A | 12/1993 | Hu et al. |
| 5,611,843 | A | 3/1997 | Ho |
| 6,099,621 | A | 8/2000 | Ho |
| 6,579,331 | B1 | 6/2003 | Ho |
| 6,984,372 | B2 | 1/2006 | Randhava et al. |
| 7,011,694 | B1 | 3/2006 | Ho |

FOREIGN PATENT DOCUMENTS

| | | |
|---|---|---|
| WO | 98/41308 | 9/1998 |
| WO | 99/06138 | 2/1999 |

OTHER PUBLICATIONS

International Search Report and Written Opinion from International Application No. PCT/US05/04020, mailed Aug. 28, 2006.

*Primary Examiner* — Ana Woodward

(74) *Attorney, Agent, or Firm* — Calfee, Halter & Griswold LLP

(57) ABSTRACT

Membranes, methods of making membranes, and methods of separating gases using membranes are provided. The membranes can include at least one hydrophilic polymer, at least one cross-linking agent, at least one base, and at least one amino compound. The methods of separating gases using membranes can include contacting a gas stream containing at least one of $CO_2$, $H_2S$, and HCl with one side of a nonporous and at least one of $CO_2$, $H_2S$, and HCl selectively permeable membrane such that at least one of $CO_2$, $H_2S$, and HCl is selectively transported through the membrane.

18 Claims, No Drawings

MEMBRANES, METHODS OF MAKING MEMBRANES, AND METHODS OF SEPARATING GASES USING MEMBRANES

CROSS-REFERENCE TO RELATED APPLICATIONS

This application is a continuation of U.S. patent application Ser. No. 11/666,700, entitled "MEMBRANES, METHODS OF MAKING MEMBRANE, AND METHODS OF SEPARATING GASES USING MEMBRANES," filed Aug. 21, 2007, which claims priority to international Application Ser. No. PCT/US05/40420, filed Nov. 4, 2005, which claims priority to and any other benefit of U.S. Provisional Application Ser. No. 60/625,517, filed Nov. 5, 2005, which is incorporated by reference in its entirety herein.

This invention was supported by US Department of Energy Grant No. DE-FC36-03AL68510. The government has certain rights in this invention.

BACKGROUND

There are numerous industrial processes that produce gas streams containing at least one of $CO_2$, $H_2S$, and $HCl$. It is often desirable to remove the $CO_2$, $H_2S$, and/or $HCl$ from the other components of the gas streams, such as $H_2$ and $N_2$. One technique used to selectively remove $CO_2$, $H_2S$, and/or $HCl$ from streams is to absorb the $CO_2$, $H_2S$, and/or $HCl$ in an amine solution. Another technique used is to adsorb the $CO_2$, $H_2S$, and/or $HCl$ on a molecular sieve. The scientific and industrial community has also used membranes to separate components in a process stream. There remains a need in the art for additional compositions, membranes, methods of making membranes, and methods of separating gases.

SUMMARY

In accordance with embodiments of the present invention, compositions are provided. The compositions comprise at least one hydrophilic polymer, at least one cross-linking agent, at least one base, and at least one amino compound. The amino compound comprises at least one of a polyamine and a salt of aminoacid. The aminoacid salt is selected from salts having the formula:

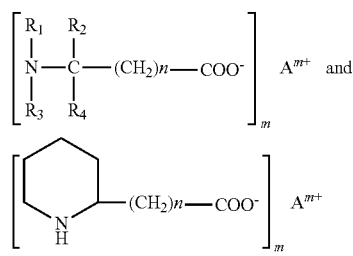

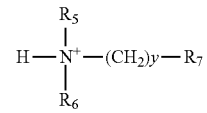

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3 and an amine cation having the formula:

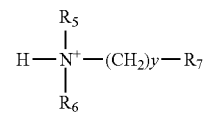

wherein $R_5$ and $R_6$ are hydrogen or hydrocarbon groups having from 1 to 4 carbon atoms, $R_7$ is hydrogen or a hydrocarbon group having from 1 to 4 carbon atoms or an alkyl amine of from 2 to 6 carbon atoms and 1 to 4 nitrogen atoms, y is an integer ranging from 1 to 4, and m is an integer equal to the valence of the cation. The base is selected from potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof.

In accordance with embodiments of the present invention processes for separating at least one of $CO_2$, $H_2S$, and $HCl$ from a gas stream containing at least one of $CO_2$, $H_2S$, and $HCl$ are provided. The processes comprise contacting a gas stream containing at least one of $CO_2$, $H_2S$, and $HCl$ with one side of a nonporous and at least one of $CO_2$, $H_2S$, and $HCl$ selectively permeable membrane and withdrawing from the obverse side of the membrane a permeate containing of at least one of $CO_2$, $H_2S$, and $HCl$, wherein at least one of $CO_2$, $H_2S$, and $HCl$ is selectively removed from the gaseous stream. The membrane comprises at least one hydrophilic polymer, at least one cross-linking agent, at least one base, and at least one amino compound. The amino compound comprises at least one of a polyamine and a salt of aminoacid, and the aminoacid salt is selected from salts having the formula:

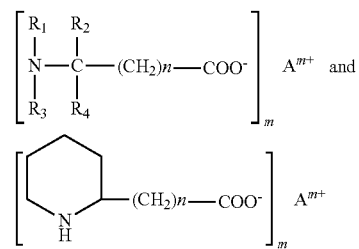

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3 and an amine cation having the formula:

wherein $R_5$ and $R_6$ are hydrogen or hydrocarbon groups having from 1 to 4 carbon atoms, $R_7$ is hydrogen or a hydrocarbon group having from 1 to 4 carbon atoms or an alkyl amine of from 2 to 6 carbon atoms and 1 to 4 nitrogen atoms, y is an integer ranging from 1 to 4, and m is an integer equal to the valence of the cation. The base is selected from potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. The at least one of $CO_2$, $H_2S$, and HCl is selectively transported through the membrane.

In accordance with further embodiments of the present invention methods for producing a nonporous membrane for separating at least one of $CO_2$, $H_2S$, and HCl from a gaseous stream containing at least one of $CO_2$, $H_2S$, and HCl are provided. The method comprises: forming a casting solution of a solvent, at least one hydrophilic polymer, at least one cross-linking agent, at least one base, and at least one amino compound; casting the solution on a substrate; and evaporating the solvent such that a nonporous membrane is formed. The amino compound comprises at least one of a polyamine and a salt of aminoacid. The aminoacid salt is selected from salts having the formula:

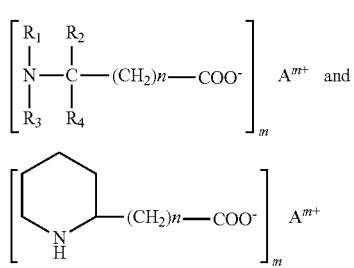

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3 and an amine cation having the formula:

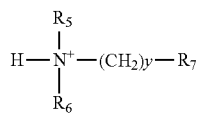

wherein $R_5$ and $R_6$ are hydrogen or hydrocarbon groups having from 1 to 4 carbon atoms, $R_7$ is hydrogen or a hydrocarbon group having from 1 to 4 carbon atoms or an alkyl amine of from 2 to 6 carbon atoms and 1 to 4 nitrogen atoms, y is an integer ranging from 1 to 4, and m is an integer equal to the valence of the cation. The base is selected from potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof.

In accordance with embodiments of the present invention methods for producing a nonporous membrane for separating at least one of $CO_2$, $H_2S$, and HCl from a gaseous stream containing at least one of $CO_2$, $H_2S$, and HCl are provied. The methods comprise: forming a casting solution of a solvent, at least one hydrophilic polymer, at least one cross-linking agent, and at least one base, and at least one amino compound; heating the solution; casting the solution on a substrate; and evaporating the solvent such that a nonporous membrane is formed. The amino compound comprises at least one of a polyamine and a salt of aminoacid. The aminoacid salt is selected from salts having the formula:

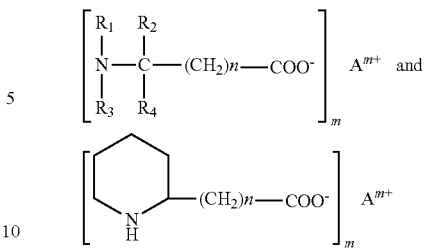

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3 and an amine cation having the formula:

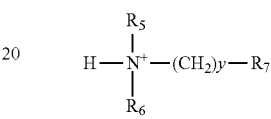

wherein $R_5$ and $R_6$ are hydrogen or hydrocarbon groups having from 1 to 4 carbon atoms, $R_7$ is hydrogen or a hydrocarbon group having from 1 to 4 carbon atoms or an alkyl amine of from 2 to 6 carbon atoms and 1 to 4 nitrogen atoms, y is an integer ranging from 1 to 4, and m is an integer equal to the valence of the cation. The base is selected from potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof;

It will be understood that the present invention is not limited to the embodiments described above.

DETAILED DESCRIPTION OF EMBODIMENTS OF THE INVENTION

The present invention will now be described with occasional reference to the specific embodiments of the invention. This invention may, however, be embodied in different fowls and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, properties such as molecular weight, reaction conditions, and so forth as used in the description and claims are to be understood as being modified in all instances by the term "about." Accordingly, unless otherwise indicated, the numerical properties set forth in the following description and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from errors found in their respective measurements.

In accordance with embodiments of the present invention, compositions are provided. The compositions comprise at least one of at least one hydrophilic polymer and at least one amino compound, at least one cross-linking agent, and at least one base. The amino compound comprises at least one of a polyamine and a salt of aminoacid. The compositions can be used to foiui nonporous membranes as discussed herein. The compositions can comprise any suitable amount of the hydrophilic polymers. For example, the compositions can comprise from about 10 to about 90 percent hydrophilic polymers by weight of the composition. The compositions can comprise any suitable amount of cross-linking agents. For example, the compositions can comprise about 1 to about 40 percent cross-linking agents by weight of the composition. The compositions can comprise any suitable amount of bases. For example, the compositions can comprise about 1 to about 40 percent bases by weight of the composition. The compositions can comprise any suitable amount of the amino compounds. For example, the compositions can comprise from about 10 to about 90 percent polyamines by weight of the composition and/or about 10 to about 90 percent aminoacid salts by weight of the composition.

The hydrophilic polymers suitable for use in the present invention include, but are not limited to, polyvinylalcohol, polyvinylacetate, polyethylene oxide, polyvinylpyrrolidone, polyacrylamine, and blends, and copolymers thereof. In one example, the hydrophilic polymer comprises polyvinylalcohol.

The polyamines suitable for use in the present invention include, but are not limited to, polyallylamine, polyethylenimine, poly-N-1,2-dimethylpropylallylamine, poly-N-methylallylamine, poly-N,N-dimethylallylamine, poly-2-vinylpiperidine, and poly-4-vinylpiperidine, and blends and copolymers thereof. In one example, the hydrophilic polymer comprises polyallylamine. In another example, the hydrophilic polymer comprises of polyethylenimine.

It will be understood that the compositions of the present invention can include either hydrophilic polymers, polyamines, or combinations thereof. It will be further understood that the hydrophilic polymers and polyamines may have any suitable weight average molecular weights. For example, the hydrophilic polymers and polyamines can have weight average molecular weights in the range of from about 15,000 to about 2,000,000 and from about 50,000 to about 200,000. In another example, the polyamines can comprise polyethylenimines with molecular weights in the range of from about 50,000 to about 100,000. In yet another example, the hydrophilic polymers can comprise polyvinylalcohols with molecular weights in the range of from about 50,000 to about 150,000.

The aminoacid salts in the compositions of the present invention are selected from salts having the formula:

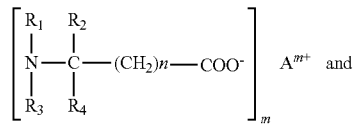

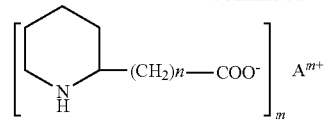

wherein $R_1$, $R_2$, $R_3$, and $R_4$ are hydrogen or hydrocarbon groups having from 1 to 4 carbon atoms, n is an integer ranging from 0 to 4, $A^{m+}$ is a cation having a valence of 1 to 3 and an amine cation having the formula:

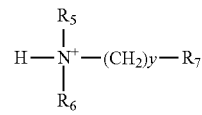

wherein $R_5$ and $R_6$ are hydrogen or hydrocarbon groups having from 1 to 4 carbon atoms, $R_7$ is hydrogen or hydrocarbon groups having from 1 to 4 carbon atoms or an alkyl amine of from 2 to 6 carbon atoms and 1 to 4 nitrogen atoms, y is an integer ranging from 1 to 4, and m is an integer equal to the valence of the cation. It will be understood that the hydrocarbon can be saturated or unsaturated, branched or unbranched, and substituted or unsubstituted hydrocarbon, which may be substituted with heteroatoms in the hydrocarbon chain or at the end of the hydrocarbon chain. In one example, $A^{m+}$ is a metal cation, and it can be selected from Groups Ia, IIa, IIIa, and VIII of the Periodic Table of Elements. In another example, $A^{m+}$ can comprise lithium, aluminum, or iron. In yet another example, the aminoacid salt can comprise aminoisobutyric acid-K salt, dimethylglycine-K salt, or dimethylglycine-Li salt.

The cross-linking agents suitable for use in the present invention include, but are not limited to, formaldehyde, glutaraldehyde, maleic anhydride, glyoxal, divinylsulfone, toluenediisocyanate, trimethylol melamine, terephthalatealdehyde, epichlorohydrin, vinyl acrylate, and combinations thereof. In one example, the cross-linking agent comprises formaldehyde, glutaraldehyde, or maleic anhydride.

The bases suitable for use in the present invention include, but are not limited to, potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof. In one example, the base comprises potassium hydroxide. It is believed, without intending to be limiting, that the base acts as a catalyst to catalyze the cross-linking of hydrophilic polymers and polyamines in the compositions during formation of the membranes. The base or bases remain in the membranes and constitute part of the membranes.

In accordance with embodiments of the present invention, the compositions can be used to form nonporous membranes. It will be understood that the term "nonporous membrane" refers to a membrane having a at least a portion that is substantially nonporous such that a gas moves through the nonporous portion via diffusion rather than separation from a larger gas by pores. In one example, the membranes of the present invention are permeable to at least one of $CO_2$, $H_2S$, or HCl. In another example, the membranes of the present invention are $CO_2$ selective versus hydrogen, nitrogen, or combinations thereof. In yet another example, the membranes of the present invention are $H_2S$ selective versus hydrogen, nitrogen, or combinations thereof. In yet another example, the membranes of the present invention are HCl selective versus hydrogen, nitrogen, or combinations thereof. In a further example, the membranes of the present invention are $CO_2$, $H_2S$, and HCl selective versus hydrogen, nitrogen, or combinations thereof. In another example, the membranes of the present invention may be used at temperatures of about 100° C. and greater than about 100° C. In yet another example, the membranes of the present invention may be used at temperatures of from about 100° C., about 110° C., about 120° C., about 130° C. about 140° C., about 150° C., about 160° C., about 170° C., and about 180° C. In another example, the membranes of the present invention may be used at temperatures of less than about 100° C. The membranes can be free standing membranes or composite membranes.

In accordance with embodiments of the present invention, methods for producing nonporous membranes are provided. Formulations for forming the membranes are prepared using the compositions of the present invention. The formulations can be prepared by first forming a casting solution of at least one of the hydrophilic polymer, the cross-linking agent, the base, and the amino compound in a suitable solvent. One example of a suitable solvent is water. In one example, the amount of water employed will be in the range of from about 50% to about 99%. The membrane composition can then be recovered from the casting solution by removing the solvent, for example, by allowing the solvent to evaporate.

In an alternative example, the casting solution can be used in forming a nonporous membrane. The resulting casting solution or membrane composition is formed into a nonporous membrane by using any suitable techniques. For example, the casting solution can be cast onto a substrate using any suitable techniques, and the solvent may be evaporated such that a nonporous membrane is formed on the substrate. Examples of suitable techniques include, but are not limited to, "knife casting" or "dip casting". Knife casting is a process in which a knife is used to draw a polymer solution across a flat substrate to form a thin film of a polymer solution of uniform thickness after which the solvent of the polymer solution is evaporated, at ambient temperatures or temperatures up to about 100° C. or higher, to yield a fabricated membrane. When, for example, a glass plate is used as the substrate, the membrane can then be removed from the substrate providing a free standing polymer membrane. When, alternatively, the flat substrate used is a non-selective porous support such as porous polytetrafluoroethylene, the resulting membrane is a composite membrane comprising the selective membrane polymer and the support.

Dip casting is a process in which a polymer solution is contacted with a non-selective porous support. Then excess solution is permitted to drain from the support, and the solvent of the polymer solution is evaporated at ambient or elevated temperatures as discussed above. The membrane comprises both the membrane polymer and the porous support. The membranes of the present invention also may be shaped in the form of hollow fibers, tubes, films, sheets, etc.

In other embodiments of the present invention, membranes formed from compositions containing a cross-linking agent can be formed in any suitable manner. For example, the compositions of the present invention, including any solvent, can be heated at a temperature and for a time sufficient for cross-linking to occur. In one example, cross-linking temperatures in the range from about 80° C. to about 100° C. are employed. In another example, cross-linking occurs in from about 1 to about 72 hours. The resulting solution can be cast onto a substrate and the solvent evaporated, as discussed above. In yet another example, a higher degree of cross-linking for the cast membrane after solvent removal takes place at about 100° C. to about 180° C., and the cross-linking occurs in from about 1 to about 72 hours.

In other embodiments of the present invention, an additive may be included in the composition before forming a membrane to increase the water retention ability of the membrane. Suitable additives include, but are not limited to, polystyrenesulfonic acid-K salt, polystyrenesulfonic acid-Na salt, polystyrenesulfonic acid-Li salt, sulfonated polyphenyleneoxides, alum, and combinations thereof. In one example, the additive comprises polystyrenesulfonic acid-K salt.

In accordance with embodiments of the present invention, processes for separating acid gases from a gas stream containing at least one acid gas are provided. The processes include contacting a gas stream containing at least one acid gas with one side of a nonporous acid gas selectively permeable membrane of the present invention, and withdrawing from the obverse side of the membrane a permeate containing at least one acid gas, wherein the acid gas is selectively removed from the gaseous stream. The permeate comprises the at least one acid gas in increased concentration relative to the feed stream. By "permeate" is meant that portion of the feed stream which is withdrawn at the obverse or second side of the membrane, exclusive of other fluids such as a sweep gas or liquid which may be present at the second side of the membrane. In one example, the acid gas is at least one of $CO_2$, $H_2S$, or HCl.

Without intending to be limiting, the membranes of the present invention may be used for the removal of at least one of $CO_2$, $H_2S$, or HCl from gases including synthesis gases derived from fossil fuels that require hydrogen purification for fuel cell, electricity generation, and hydrogenation applications, biogas for renewable energy, and natural gas for commercial uses. The membranes can be used for removal of $CO_2$ from flue gas containing nitrogen. It will be understood that the membranes of the present invention can be used for any other suitable gases.

The present invention will be better understood by reference to the following examples which are offered by way of illustration not limitation.

EXAMPLES

This invention is illustrated with the following non-limiting examples. In the examples, the separation factor (selectivity) for acid gas vs. hydrogen is expressed as follows:

$$\text{Separation Factor} = \frac{\text{Acid Gas/Hydrogen concentration ratio in the permeate}}{\text{Acid Gas/Hydrogen concentration ratio in the retentate}}$$

The retentate refers to the mixture on the feed side of the membrane that is rejected/retained by the membrane under the operating conditions. Similarly, the separation factor for acid gas vs. nitrogen is expressed as follows:

$$\text{Separation Factor} = \frac{\text{Acid Gas/Nitrogen concentration ratio in the permeate}}{\text{Acid Gas/Nitrogen concentration ratio in the retentate}}$$

The flux, expressed in units of cm³ (STP)/(cm²·s), is related to the permeability, expressed in units of Barrer (1 Barrer= $10^{-10}$ cm³ (STP)·cm/(cm²·s·cm Hg), in the following equation:

Flux=Permeability $(p_1-p_2)/l$ where $p_1$ and $p_2$ are the acid gas (carbon dioxide, hydrogen sulfide, or hydrogen chloride) partial pressures in the retentate and permeate streams, respectively, and l is the membrane thickness. The partial pressures are determined based on concentration measurements by gas chromatography and total pressure measurements by using pressure gauges. The flux is determined based on permeate concentration measurements by gas chromatogaphy and permeate stream flow rate measurements by using a flow meter.

Example 1

Synthesis of 23.6 wt % Dimethylglycine-Li Salt, 23.6 wt % Polyethylenimine, 46.4 wt % (Polyvinylalcohol/Formaldehyde at 44/3.9 by weight) and 6.4 wt % KOH Membrane In order to prepare a polyvinylalcohol (PVA) solution, 13.15 g of PVA was added to 88.54 g of water with stirring and heating at about 80° C. until a clear solution of the polymer was obtained. To this PVA solution were added an aqueous 37 wt % formaldehyde solution of 3.19 g (1.18 g of formaldehyde) and an aqueous KOH solution containing 2.01 g KOH and 8.72 g water under stirring. The resulting solution was heated at 80-85° C. and maintained at this temperature range with stirring for 100 minutes to enhance the cross-linking of PVA with formaldehyde, catalyzed by KOH. In this solution, the KOH concentration was 1.74 wt %. The PVA/formaldehyde weight ratio of 13.15/1.18, i.e., 44 (PVA monomer molecular weight)/3.9 (13% of formaldehyde molecular weight), corresponds to a maximum PVA cross-linking degree of 26%. To this solution was added an aqueous polyethylenimine solution containing 7.38 g polyethylenimine and 44.90 g water under stirring at 80-85° C.

Separately, an N,N-dimethylglycine-Li salt solution was prepared by adding 6.75 g (0.066 mole) of N,N-dimethylglycine and 2.77 g (0.066 mole) of LiOH.H₂O slowly to 9.10 g of water with stirring. This solution was added to the above PVA/formaldehyde/KOH solution under stirring at 80-85° C. for about 30 minutes to obtain a clear, homogeneous solution.

The solution was then centrifuged at 5000 rpm while cooling for 30 minutes. Following centrifugation, the membrane was knife-cast (with a gap setting of 16 mils) onto a support of microporous polytetrafluoroethylene. Water was allowed to evaporate from the membrane in a hood at ambient conditions overnight. The membrane was then heated in an oven at 120° C. for about 6 hours. The resulting membrane comprised about 23.6 wt % dimethylglycine-Li salt, 23.6 wt % polyethylenimine, 46.4 wt % (polyvinylalcohol/formaldehyde at 44/3.9 by weight), and 6.4 wt % KOH. The membrane had a thickness of about 35 microns (exclusive of the support).

Comparative Example A

Synthesis of 25 wt % Dimethylglycine-Li Salt, 25 wt % Polyethylenimine and 50 wt % (Polyvinylalcohol/Formaldehyde at 44/3.9 by weight) Membrane Polyvinylalcohol (PVA) in an amount of 8.76 g was added to 58.82 g of water with stirring and heating at about 80° C. until a clear solution of the polymer was obtained. To this PVA solution was added an aqueous 37 wt % formaldehyde solution of 2.04 g (0.76 g of formaldehyde) under stirring. The resulting solution was heated at about 95° C. and maintained at this temperature with stirring for about 4 hours to thermally enhance the cross-linking of PVA with formaldehyde. To this solution was added an aqueous polyethylenimine solution containing 4.58 g polyethylenimine and 30.05 g water under stirring at 80-85° C. Separately, an N,N-dimethylglycine-Li salt solution was prepared by adding 4.50 g (0.044 mole) of N,N-dimethylglycine and 1.83 g (0.044 mole) of LiOH.H₂O slowly to 6.91 g of water with stirring. This solution was added to the above PVA/formaldehyde solution under stirring at 80-85° C. for about 30 minutes to obtain a clear, homogeneous solution.

The solution was then centrifuged while cooling for about 30 minutes. Following centrifugation, the membrane was knife-cast (with a gap setting of 18 mils) onto a support of microporous polytetrafluoroethylene. Water was allowed to evaporate from the membrane in a hood at ambient conditions overnight. The membrane was then heated in an oven at 120° C. to give the resulting membrane. This resulting membrane comprised about 25 wt % dimethylglycine-Li salt, 25 wt % polyethylenimine, and 50 wt % (polyvinylalcohol/formaldehyde at 44/3.9 by weight). The membrane had a thickness of about 39 microns (exclusive of the support).

This membrane has the same ratios of dimethylglycine-Li salt/polyethylenhnine/polyvinylalcohol (PVA)/formaldehyde as those of the membrane of Example 1. However, the membrane of Example 2 did not contain KOH whereas the membrane of Example 1 included KOH. The membrane of Example 2 was synthesized in the similar procedure taught in U.S. Pat. Nos. 5,611,843 and 6,099,621, and this membrane served as the comparative example.

Permeation Measurement of Membrane of Example 1

In the measurement using a gas permeation apparatus to evaluate the separation factor (selectivity) of carbon dioxide or hydrogen sulfide vs. hydrogen (or nitrogen) and the permeability of carbon dioxide or hydrogen sulfide, the membrane was placed in a permeation cell comprising the first compartment for contacting a feed stream on the upstream side of the membrane and the second compartment for withdrawing the permeate from the downstream side of the membrane. The active membrane area in the cell was 45.6 cm². A feed gas comprising 40% hydrogen, 20% carbon dioxide, and 40% nitrogen (on the dry basis) under a total pressure of about 2 atm was contacted against the membrane at a flow rate of about 60 cm³/min (at ambient condition) in the gas permeation apparatus. The permeate was swept by nitrogen under a pressure of about 1 atm and a total flow rate of about 30 cm³/min for the permeate/nitrogen stream. Both the feed and sweep streams were humidified by injecting 0.03 ml/min of deionized water into each of the two streams prior to contacting the membrane. Each permeation measurement was carried out at an operating temperature.

For the membrane of Example 1 comprising about 23.6 wt % dimethylglycine-Li salt, 23.6 wt % polyethylenimine, 46.4 wt % (polyvinylalcohol/formaldehyde at 44/3.9 by weight), and 6.4 wt % KOH (with a thickness of 35 microns), the carbon dioxide/hydrogen selectivity results obtained were 1782, 277, and 285 at 80° C., 100° C., and 110° C., respectively. The carbon dioxide permeability results obtained were 338, 49, and 50 Barrers at 80° C., 100° C., and 110° C., respectively.

Comparative Permeation Measurement of Membrane of Comparative Example A

The membrane of Comparative Example A comprising about 25 wt % dimethylglycine-Li salt, 25 wt % polyethylenimine, and 50 wt % (polyvinylalcohol/formaldehyde at 44/3.9 by weight) was evaluated in the same way as the membrane of Example 1 as described earlier in Permeation Measurement of Membrane of Example 1. The carbon dioxide/hydrogen selectivity results obtained were 602, 453, 11 and 7 at 80° C., 90° C., 100° C., and 110° C., respectively. The selectivity result dropped drastically at 100° C., indicating excessive membrane swelling and insufficient thermal stability at the temperatures greater than 100° C.

In comparison of the carbon dioxide/hydrogen selectivity results between the membranes of Examples 1 and Comparative Example A, the membrane of Example 1 had better results than the membrane of Comparative Example A, particularly for temperatures greater than 100° C. At temperatures greater than 100° C., the membrane of Comparative Example A had a carbon dioxide/hydrogen selectivity of 11 or lower. However, the membrane of Examples 1 of the present invention still had a carbon dioxide/hydrogen selectivity of 277 or higher at 100-110° C. Thus, this membrane of the present invention that was synthesized with the base (KOH) outperformed the membrane that was synthesized without this base.

Example 2

Synthesis of 23.7 wt % Dimethylglycine-K Salt, 4.7 wt % Polystyrenesulfonic Acid-K Salt, 54 wt % (Polyvinylalcohol/Formaldehyde at 44/9 by weight) and 17.6 wt % KOH Membrane To 54.06 g of water was added 8.823 g of polyvinylalcohol (PVA) with stirring and heating at about 80° C. until a clear solution of the polymer was obtained. Separately, a polystyrenesulfonic acid-K salt solution was prepared by adding 2.563 g of 30% polystyrenesulfonic acid and 0.232 g of KOH slowly to 1.293 g of water with stirring. This solution was adjusted using KOH to have a pH of 7 and contained 0.927 g of polystyrenesulfonic acid-K salt. This solution was added to the PVA solution with stirring at about 80° C. To the PVA solution with the polystyrenesulfonic acid-K salt were added an aqueous 37 wt % formaldehyde solution of 4.869 g (1.802 g of formaldehyde) and an aqueous KOH solution containing 3.460 g KOH and 3.341 g water under stirring. The resulting solution was heated at about 80° C. and maintained at this temperature with stirring for 6 hours to enhance the cross-linking of PVA with formaldehyde, catalyzed by KOH. In this solution, the KOH concentration was about 4.4 wt %. The PVA/formaldehyde weight ratio of 8.823/1.802, i.e., 44 (PVA monomer molecular weight)/9 (30% of formaldehyde molecular weight), corresponds to a maximum PVA cross-linking degree of 60%. Separately, an N,N-dimethylglycine-K salt solution was prepared by adding 3.369 g (0.033 mole) of N,N-dimethylglycine and 1.898 g (0.033 mole) of KOH slowly to 3.015 g of water with stirring. This solution was added to the above PVA/formaldehyde/KOH/polystyrenesulfonic acid-K salt solution under stirring at about 80° C. for about 30 minutes to obtain a clear, homogeneous solution.

The solution was then centrifuged at 8000 rpm while cooling for 12 minutes. Following centrifugation, the membrane was knife-cast (with a gap setting of 11 mils) onto a support of microporous polytetrafluoroethylene. Water was allowed to evaporate from the membrane in a hood at ambient conditions overnight. The membrane was then heated in an oven at 120° C. for about 6 hours. The resulting membrane comprised about 23.7 wt % dimethylglycine-K Salt, 4.7 wt % polystyrenesulfonic acid-K salt, 54.0 wt % (polyvinylalcohol/formaldehyde at 44/9 by weight), and 17.6 wt % KOH. The membrane had a thickness of about 33 microns (exclusive of the support).

Permeation Measurement of Membrane of Example 2

The membrane of Example 2 comprising about 23.7 wt % dimethylglycine-K Salt, 4.7 wt % polystyrenesulfonic acid-K salt, 54.0 wt % (polyvinylalcohol/formaldehyde at 44/9 by weight), and 17.6 wt % KOH (with a thickness of about 33 microns) was evaluated in the same way described in Permeation Measurement of Membrane of Example 1. The carbon dioxide/hydrogen selectivity and carbon dioxide permeability results obtained at 120-170° C. are shown in Table 1.

TABLE 1

The carbon dioxide/hydrogen selectivity and carbon dioxide permeability results for the membrane of Example 2.

| Temperature (° C.) | Carbon Dioxide/ Hydrogen Selectivity | Carbon Dioxide Permeability (Barrer) |
| --- | --- | --- |
| 120 | 311 | 1287 |
| 140 | 200 | 722 |
| 150 | 84 | 318 |
| 160 | 42 | 202 |
| 170 | 25 | 172 |

As shown in this table, this membrane possessed a high selectivity of carbon dioxide vs. hydrogen as well as high carbon dioxide permeability. Thus, this membrane is useful for the removal of carbon dioxide from the hydrogen-containing synthesis gas comprising this impurity to increase the concentration of hydrogen for hydrogen purification and enhancement.

Example 3

Synthesis of 27.2 wt % Aminoisobutyric Acid-K Salt, 10.1 wt % Polyallylamine, 45.9 wt % (Polyvinylalcohol/Formaldehyde at 44/9 by Weight) and 16.8 wt % KOH Membrane To 50.588 g of water was added 8.800 g of polyvinylalcohol (PVA) with stirring and heating at about 80° C. until a clear solution of the polymer was obtained. To this PVA solution were added an aqueous 37 wt % formaldehyde solution of 4.868 g (1.801 g of formaldehyde) and an aqueous KOH solution containing 3.880 g KOH and 3.933 g water under stirring. The resulting solution was heated at about 80° C. and maintained at this temperature with stirring for 6 hours to enhance the cross-linking of PVA with formaldehyde, catalyzed by KOH. In this solution, the KOH concentration was about 5.4 wt %. The PVA/formaldehyde weight ratio of 8.800/1.801, i.e., 44 (PVA monomer molecular weight)/9 (30% of formaldehyde molecular weight), corresponds to a maximum PVA cross-linking degree of 60%. Separately, an aminoisobutyric acid-K salt solution was prepared by adding 4.480 g (0.044 mole) of aminoisobutyric acid and 2.580 g (0.046 mole) of KOH slowly to 5.284 g of water with stirring. A polyallylamine solution was prepared by adding 2.327 g polyallylamine in 15.234 g water. To the above PVA/formaldehyde/KOH solution were added the aminoisobutyric acid-K salt solution and the polyallylamine solution under stirring at about 80° C. for about 30 minutes to obtain a clear, homogeneous solution.

The solution was then centrifuged at 8000 rpm while cooling for 10 minutes. Following centrifugation, the membrane was knife-cast (with a gap setting of 11 mils) onto a support of microporous polytetrafluoroethylene. Water was allowed to evaporate from the membrane in a hood at ambient conditions overnight. The membrane was then heated in an oven at 120° C. for about 6 hours. The resulting membrane comprised about 27.2 wt % aminoisobutyric acid-K salt, 10.1 wt % polyallylamine, 45.9 wt % (polyvinylalcohol/formaldehyde at 44/9 by weight), and 16.8 wt % KOH. The membrane had a thickness of about 26 microns (exclusive of the support).

Permeation Measurement of Membrane of Example 3

The membrane of Example 3 comprising about 27.2 wt % aminoisobutyric acid-K salt, 10.1 wt % polyallylamine, 45.9 wt % (polyvinylalcohol/formaldehyde at 44/9 by weight), and 16.8 wt % KOH (with a thickness of about 26 microns) was evaluated in the similar way described in Permeation Measurement of Membrane of Example 1 except for the water injection rate to the feed gas. The water injection rate to the feed gas was 0.03 ml/min at 120-130° C., 0.06 ml/min at 140° C., 0.09 ml/min at 150° C., and 0.12 ml/min at 160-180° C. The carbon dioxide/hydrogen selectivity and carbon dioxide permeability results obtained at 120-180° C. are shown in Table 2.

TABLE 2

The carbon dioxide/hydrogen selectivity and carbon dioxide permeability results for the membrane of Example 3.

| Temperature (° C.) | Carbon Dioxide/ Hydrogen Selectivity | Carbon Dioxide Permeability (Barrer) |
|---|---|---|
| 120 | 262 | 6196 |
| 130 | 193 | 3922 |
| 140 | 161 | 4463 |
| 150 | 80 | 3651 |
| 160 | 67 | 3039 |
| 170 | 53 | 2241 |
| 180 | 10.1 | 1941 |

As shown in this table, this membrane exhibited a very high selectivity of carbon dioxide vs. hydrogen as well as very high carbon dioxide permeability. Thus, this membrane is very useful for the removal of carbon dioxide from the hydrogen-containing synthesis gas comprising this impurity to increase the concentration of hydrogen for hydrogen purification and enhancement.

Example 4

Synthesis of 19.6 wt % Aminoisobutyric Acid-K Salt, 9.8 wt % Polyallylamine, 52.5 wt % (Polyvinylalcohol/Formaldehyde at 44/15 by weight) and 18.1 wt % KOH Membrane To 48.361 g of water was added 8.805 g of polyvinylalcohol (PVA) with stirring and heating at about 80° C. until a clear solution of the polymer was obtained. To this PVA solution were added an aqueous 37 wt % formaldehyde solution of 8.123 g (3.006 g of formaldehyde) and an aqueous KOH solution containing 4.072 g KOH and 4.331 g water under stirring. The resulting solution was heated at about 80° C. and maintained at this temperature with stirring for 23.5 hours to enhance the cross-linking of PVA with formaldehyde, catalyzed by KOH. In this solution, the KOH concentration was about 5.5 wt %. The PVA/formaldehyde weight ratio of 8.805/3.006, i.e., 44 (PVA monomer molecular weight)/15 (50% of formaldehyde molecular weight), corresponds to a maximum PVA cross-linking degree of 100%.

Separately, an aminoisobutyric acid-K salt solution was prepared by adding 3.123 g of aminoisobutyric acid and 1.833 g of KOH slowly to 4.432 g of water with stirring. A polyallylamine solution was prepared by adding 2.206 g polyallylamine in 10.325 g water. To the above PVA/formaldehyde/KOH solution were added the aminoisobutyric acid-K salt solution and the polyallylamine solution under stirring at about 80° C. for about 10 minutes to obtain a clear, homogeneous solution.

The solution was then centrifuged at 8000 rpm while cooling for 8 minutes. Following centrifugation, the membrane was knife-cast onto a support of microporous polytetrafluoroethylene. Water was allowed to evaporate from the membrane in a hood at ambient conditions overnight. The membrane was then heated in an oven at 120° C. for about 6 hours. The resulting membrane comprised about 19.6 wt % aminoisobutyric acid-K salt, 9.8 wt % polyallylamine, 52.5 wt % (polyvinylalcohol/formaldehyde at 44/15 by weight), and 18.1 wt % KOH. The membrane had a thickness of about 51 microns (exclusive of the support).

Permeation Measurement of Membrane of Example 4

The membrane of Example 4 comprising about 19.6 wt % aminoisobutyric acid-K salt, 9.8 wt % polyallylamine, 52.5 wt % (polyvinylalcohol/formaldehyde at 44/15 by weight), and 18.1 wt % KOH (with a thickness of about 51 microns) was evaluated in the similar way described in the Permeation Measurement of Membrane of Example 1, except for the feed gas and the water injection rates. The feed gas contained 50 ppm hydrogen sulfide in 17% carbon dioxide, 1% carbon monoxide, 45% hydrogen, and 37% nitrogen (on the dry basis). The water injection rate to sweep gas was maintained constant at 0.27 ml/min. However, the water injection rate to the feed gas was 0.075 ml/min at 110° C., 0.09 ml/min at 120-130° C., and 0.12 ml/min at 140° C. Table 3 shows the carbon dioxide/hydrogen, hydrogen sulfide/hydrogen and carbon dioxide/nitrogen selectivities, and carbon dioxide and hydrogen sulfide permeabilities obtained at 110-140° C.

TABLE 3

The carbon dioxide/hydrogen, hydrogen sulfide/hydrogen and carbon dioxide/nitrogen selectivities, and carbon dioxide and hydrogen sulfide permeabilities for the membrane of Example 4.

| Temperature (° C.) | Carbon Dioxide/ Hydrogen Selectivity | Hydrogen Sulfide/ Hydrogen Selectivity | Carbon Dioxide/ Nitrogen Selectivity | Carbon Dioxide Permeability (Barrer) | Hydrogen Sulfide Permeability (Barrer) |
|---|---|---|---|---|---|
| 110 | 170 | 573 | 1218 | 8278 | 28437 |
| 120 | 234 | 685 | 1439 | 8847 | 21780 |
| 130 | 230 | 673 | 1341 | 7555 | 21233 |
| 140 | 125 | 298 | 440 | 4772 | 10015 |

As shown in this table, this membrane had very high selectivities of carbon dioxide and hydrogen sulfide vs. hydrogen as well as very high carbon dioxide and hydrogen sulfide permeabilities. In other words, this membrane is very useful for the removal of both carbon dioxide and hydrogen sulfide from the hydrogen-containing synthesis gas comprising these impurities. Also shown in this table, this membrane had very high selectivity of carbon dioxide vs. nitrogen. Thus, this membrane is also useful for the removal of the greenhouse gas, carbon dioxide, from the nitrogen-containing flue gas.

The present invention should not be considered limited to the specific examples described above, but rather should be understood to cover all aspects of the invention. Various modifications, equivalent processes, as well as numerous structures and devices to which the present invention may be applicable will be readily apparent to those of skill in the art.

It will be understood that various changes may be made without departing from the scope of the invention, which is not to be considered limited to what is described in the specification.

What is claimed is:

1. A non-porous membrane formed from a composition comprising:
at least one hydrophilic polymer, at least one cross-linking agent capable of cross-linking the hydrophilic polymer, at least one base, and at least one amino compound selected from the group consisting of a polyamine and an aminoacid salt, wherein the aminoacid salt has the formula:

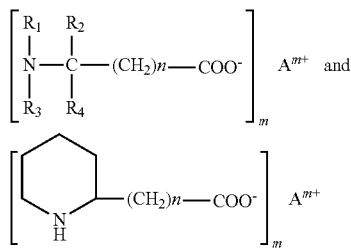

wherein $R_1$, $R_2$, $R_3$, and $R_4$ are hydrogen or hydrocarbon groups having from 1 to 4 carbon atoms, n is an integer ranging from 0 to 4, $A^{m+}$ is at least one of a cation having a valence of 1 to 3 or an amine cation having the formula:

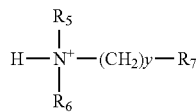

wherein $R_5$ and $R_6$ are hydrogen or hydrocarbon groups having from 1 to 4 carbon atoms, $R_7$ is hydrogen or a hydrocarbon group having from 1 to 4 carbon atoms or an alkyl amine of from 2 to 6 carbon atoms and 1 to 4 nitrogen atoms, y is an integer ranging from 1 to 4, and m is an integer equal to the valence of the cation;
wherein said base is selected from the group consisting of potassium hydroxide, sodium hydroxide, lithium hydroxide, triethylamine, N,N-dimethylaminopyridine, hexamethyltriethylenetetraamine, potassium carbonate, sodium carbonate, lithium carbonate, and combinations thereof, and
wherein the hydrophilic polymer is selected from the group consisting of polyvinylalcohol, polyvinylacetate, polyethylene oxide, polyvinylpyrrolidone, polyacrylamine, and copolymers thereof.

2. The composition as claimed in claim 1 wherein said at least one amino compound comprises a polyamine selected from the group consisting of polyallylamine, polyethylenimine, poly-N-1,2-dimethylpropylallylamine, poly-N-methylallylamine, poly-N,N-dimethylallylamine, poly-2-vinylpiperidine, and poly-4-vinylpiperidine, and copolymers thereof.

3. The composition as claimed in claim 1 wherein said at least one amino compound comprises polyallylamine.

4. The composition as claimed in claim 1 wherein said at least one amino compound comprises polyethylenimine.

5. The composition as claimed in claim 1 wherein said at least one hydrophilic polymer comprises polyvinylalcohol.

6. The composition as claimed in claim 5 wherein said at least one amino compound comprises polyallylamine.

7. The composition as claimed in claim 5 wherein said at least one amino compound comprises polyethylenimine.

8. The composition as claimed in claim 1 wherein $A^{m+}$ is a metal cation selected from the group consisting of Groups Ia, IIa, IIIa, and VIII of the Periodic Table of Elements.

9. The composition as claimed in claim 1 wherein said at least one amino compound comprises aminoisobutyric acid-K salt.

10. The composition as claimed in claim 1 wherein said at least one amino compound contains dimethylglycine-K salt.

11. The composition as claimed in claim 1 wherein said at least one amino compound comprises dimethylglycine-Li salt.

12. The composition as claimed in claim 1 wherein said at least one cross-linking agent is selected from the group consisting of formaldehyde, glutaraldehyde, maleic anhydride, glyoxal, divinylsulfone, toluenediisocyanate, trimethylol melamine, terephthalatealdehyde, epichlorohydrin, and vinyl acrylate.

13. The composition as claimed in claim 12 wherein said at least one cross-linking agent comprises foraldehyde.

14. The composition as claimed in claim 1 wherein said at least one cross-linking agent comprises from about 1 to about 40 percent by weight of said composition.

15. The composition as claimed in claim 1 wherein said at least one base comprises from about 1 to about 40 percent by weight of said composition.

16. The composition as claimed in claim 1 wherein said at least one hydrophilic polymer comprises from about 10 to about 90 percent by weight of said composition.

17. The composition as claimed in claim 1 wherein the amino compound comprises from about 10 to about 90 percent by weight of said composition.

18. The composition as claimed in claim 1 wherein said at least one base comprises potassium hydroxide.

* * * * *